United States Patent
Khabashesku et al.

(10) Patent No.: US 8,092,774 B2
(45) Date of Patent: Jan. 10, 2012

(54) NANOTUBE-AMINO ACIDS AND METHODS FOR PREPARING SAME

(75) Inventors: Valery N. Khabashesku, Houston, TX (US); Haiqing Peng, Houston, TX (US); John L. Margrave, Bellaire, TX (US); Mary Lou Margrave, legal representative, Bellaire, TX (US)

(73) Assignee: William Marsh Rice University, Houston, TX (US)

( * ) Notice: Subject to any disclaimer, the term of this patent is extended or adjusted under 35 U.S.C. 154(b) by 895 days.

(21) Appl. No.: 10/585,591

(22) PCT Filed: Jan. 18, 2005

(86) PCT No.: PCT/US2005/001310
§ 371 (c)(1),
(2), (4) Date: Jun. 15, 2009

(87) PCT Pub. No.: WO2005/070828
PCT Pub. Date: Aug. 4, 2005

(65) Prior Publication Data
US 2010/0047575 A1 Feb. 25, 2010

Related U.S. Application Data

(60) Provisional application No. 60/537,982, filed on Jan. 21, 2004.

(51) Int. Cl.
*D01F 9/12* (2006.01)
(52) U.S. Cl. ............ 423/447.2; 977/750; 562/553; 423/447.1
(58) Field of Classification Search ............ 423/447.1, 423/447.3, 445 B; 977/743, 750; 562/533
See application file for complete search history.

(56) References Cited

FOREIGN PATENT DOCUMENTS
RU 2213049 C1 * 9/2003
WO WO 2004013043 A1 * 2/2004

OTHER PUBLICATIONS

Panatarotto et al., "Synthesis, Structural Characterization, and Immunological Properties of Carbon Nanotubes . . . ", 125 J. Am. Chem. Soc. (2003), pp. 6160-6164.
Pantarotto et al., "Translocation of bioactive peptides across cell membranes by carbon nanotubes", Chem. Commun. (2004), pp. 16-17.
Iijima et al., "Single-shell carbon nanotubes of 1-nm diameter", 363 Nature (1993), pp. 603-605.
Bethune et al., "Cobalt-catalysed growth of carbon nanotubes with single-atomic-layer walls", 363 Nature (1993), pp. 605-607.
Endo et al., "The Production and Structure of Pyrolytic Carbon Nanotubes", 54 Phys. Chem. Solids (1993), pp. 1841-1848.
Zhu et al., "Improving the Dispersion and Integration of Single-Walled carbon nanotubes in Epoxy . . . ", 3(8) Nano Lett. (2003), pp. 1107-1113.
Dresselhaus et al., Science of Fullerenes and Carbon Nanotubes, Academic Press, San Diego (1996), vol. 1.

(Continued)

*Primary Examiner* — Stuart Hendrickson
*Assistant Examiner* — Richard M Rump
(74) *Attorney, Agent, or Firm* — Winstead PC

(57) ABSTRACT

The present invention is directed toward compositions comprising carbon nanotubes (CNTs) that are sidewall-functionalized with amino acid groups, and to amino acid compositions comprising carbon nanotubes. The present invention is also directed to simple and relatively inexpensive methods for the preparation of such compositions. Such compositions are expected to greatly extend the bio-medical applications of CNTs.

9 Claims, 3 Drawing Sheets

A)

"Glycine-nanotubes"

B)

"Cysteine-nanotubes"

OTHER PUBLICATIONS

Khabashesku et al., Chemistry of Carbon Nanotubes in Encyclopedia of Nanoscience and Nanotechnology, Ed. H. S. Nalwa, American Scientific Publishers (2004).
Bahr et al., "Covalent chemistry of single-wall nanotubes", 12 J. Mater. Chem., (2002), pp. 1952-1958.
Holzinger et al.,"Sidewall Functionalization of carbon Nanotubes", 40 Angew. Chem. Int. Ed. (2001), pp. 4002-4005.
Mickelson et al., Fluorination of single-wall crabon nanotubes, 296 Chem. Phys. Lett. (1998), pp. 188-194.
Mickelson et al., "Solvation of Fluorinated Single-Wall Carbon Nanotubes in Alcohol Solvents", 103 J. Phys. Chem. B (1999), pp. 4318-4322.
Boul et al., "Reversible sidewall functionalization of bucktubes", Chem. Phys. Lett. (1999), pp. 367-372.
Khabashesku et al., "Fluorination of Single-Wall Carbon Nanotubes and Subsequent Derivatization Reactions", 35(12) Acc. Chem. Res. (2002), pp. 1087-1094.
Stevens et al., "Sidewall Amino-Functionalization of Single-Walled Carbon Nanotubes..", 3(3) Nano Lett. (2003), pp. 331-336.
Zhang et al., "Sidewall Functionalization of Single-Walled Carbon Nanotubes with Hydroxyl Group-Terminated Moieties", 16(11) Chem. Mater. (2004), 1pp. 2055-2061.
Peng et al., "Sidewall Carboxylic Acid Functionalization of Single-Walled Carbon nanotubes", 125 J. Am. Chem. Soc. (2003), pp. 15174-15182.
Chiang, I. W., Ph.D. Dissertation, Rice University (2001).
Gu et al., "Cutting Single-Wall Carbon Nanotubes Through Fluorination", 2 Nano Lett. (2002), pp. 1009-1013.
Rao et al., "Nanotubes", Chemphyschem (2001) 2, pp. 78-105.
Saito et al., "Physical Properties of Carbon Nanotubes", Imperial College Press (1998), pp. 188-194.
Khabashesku et al., "Functionalization of Single-Wall Carbon Nanotubes Through C-N Bond Forming Substitutions of Fluoronanotubes", filed Nov. 18, 2003.
Nunez-Requeiro et al., "Polymerized Fullerite Structures", Physical Review Lett. (1995), 74 (2), pp. 278-281.
Shenderova et al., "Carbon Nanostructures", Cr. Revs Solid State Mater. Sci (2002) 27, pp. 227-357.
Khabashesku et al., "Functionalized Carbon Nanotubes and Nanodiamonds for Engineering and Biomedical Applications", Diamond & Related Materials, (2005), pp. 859-866.
Georgakilas et al., "Amino Acid Functionalization of Water Soluble Carbon Nanotubes", The Royal Society of Chem. (2002), pp. 3050-3051.
Iwasa et al., "New phases of C60 synthesized at high pressure", Science, 1994, 264, 1570.
Davydov et al., "Spectroscopic study of pressure-polymerized phases of C60", Phys. Rev. B., 2000, 61, 11936.
Makarova et al., "Magnetic carbon", Nature, 2001, 413, 716.

* cited by examiner wherein R= -CH₃, -CH₂CH₃, etc.

*e.g., hydrolysis performed with a 50%/50% v/v water-ethanol solution comprising an alkalai carbonate or bicarbonate Scheme 1

Scheme 2

A)

"Glycine-nanotubes"

B)

"Cysteine-nanotubes"

NANOTUBE-AMINO ACIDS AND METHODS FOR PREPARING SAME

CROSS-REFERENCE TO RELATED APPLICATIONS

This Application claims priority to U.S. Provisional Application Ser. No. 60/537,982, filed Jan. 21, 2004.

This invention was made with government support under Grant No. NCC1-02038, awarded by the National Aeronautics and Space Administration. The government has certain rights in the invention.

FIELD OF THE INVENTION

This invention relates generally to carbon nanotubes, and specifically to amino acids into which carbon nanotubes are integrated.

BACKGROUND OF THE INVENTION

There is currently great interest in the potential use of carbon nanoscale materials for medical and biological applications. This interest is at least partially fueled by the spherical or cylindrical surface morphology of many of these materials, particularly those having cage-like nanostructures that are stable with respect to cage opening under in vivo environmental conditions. However, in order to become biocompatible such carbon nanomaterials need to be surface-functionalized with organic groups that can facilitate both improved solubility in physiological solutions and selective binding affinity to bio-targets. Therefore, developing simple and cost-effective chemical methods for covalent functionalization of carbon nanocage materials has become an area of immense fundamental and industrial importance. This research holds great promise for bio-medical applications—as was recently demonstrated by the ability of modified carbon nanotubes to cross the cell membrane and enter the nuclei of cells, and their being non-toxic to the cell at concentrations up to 10 μM [Pantarotto et al., *J. Am. Chem. Soc.* 2003, 125, 6160; Pantarotto et al., *Chem. Commun.* 2004, 16-17]. Using appropriate chemistry, a variety of biologically-active molecules can be covalently attached to carbon nanostructures.

Carbon nanotubes (CNTs, aka fullerene pipes) are nanoscale carbon structures comprising graphene sheets conceptually rolled up on themselves and closed at their ends by fullerene caps. Single-walled carbon nanotubes (SWNTs) comprise but a single such graphene cylinder, while multi-walled nanotubes are made of two or more concentric graphene layers nested one within another in a manner analogous to that of a Russian nesting doll. SWNT diameters generally range from 0.4 to 4 nm. These nanotubes can be from 100 nm to several micrometers (microns) long, or longer. Since their initial preparation in 1993 [Iijima et al., *Nature*, 1993, 363, 603; Bethune et al., *Nature*, 1993, 363, 605; Endo et al., *Phys. Chem. Solids,* 1993, 54, 1841], SWNTs have been studied extensively due to their unique mechanical, optical, electronic, and other properties. For example, the remarkable tensile strength of SWNTs has resulted in their use in reinforced fibers and polymer nanocomposites [Zhu et al., *Nano Lett.* 2003, 3, 1107 and references therein].

SWNTs normally self-assemble into aggregates or bundles in which up to several hundred tubes are held together by van der Waals forces. For many applications, including bio-medical ones, the separation of individual nanotubes from these bundles is essential. Such separation improves the dispersion and solubilization of the nanotubes in the common organic solvents and/or water needed for their processing and manipulation. Covalent modifications of the SWNT surface generally help to solve this problem by improving the solubility and processability of the nanotubes. While chemical functionalizations of the nanotube ends generally do not change the electronic and bulk properties of these materials, sidewall functionalizations do significantly alter the intrinsic properties of the nanotubes. However, the extent of documented results in this new field of chemistry is limited, primarily due to the current high cost of the nanotubes. Additional challenges faced in the modifications of SWNT sidewalls are related to their relatively poor reactivity—largely due to a much lower curvature of the nanotube walls relative to the more reactive fullerenes [M. S. Dresselhaus, G. Dresselhaus, P. C. Eklund, *Science of Fullerenes and Carbon Nanotubes*, Academic Press, San Diego, 1996, Vol. 1], and to the growing strain within the tubular structure with increasing number and size of functional groups attached to graphene walls. The $sp^2$-bonding states of all the carbon atoms comprising the nanotube framework facilitate the predominant occurance of addition-type reactions. The best characterized examples of these reactions include additions to the SWNTs of nitrenes, azomethine ylides and aryl radicals generated from diazonium salts [V. N. Khabashesku, J. L. Margrave, *Chemistry of Carbon Nanotubes in Encyclopedia of Nanoscience and Nanotechnology*, Ed H. S. Nalwa, American Scientific Publishers, 2004; Bahr et al., *J. Mater. Chem.,* 2002, 12, 1952; Holzinger et al., *Angew Chem. Int. Ed.,* 2001, 40, 4002].

The first sidewall functionalization of SWNTs was accomplished by attaching fluorine groups, through direct fluorination, the result being fluoronanotubes [Mickelson et al., *Chem. Phys. Lett.,* 1998, 296, 188]. These fluorinated nanotube derivatives were found to be soluble in alcohols and other polar solvents [Mickelson et al., *J. Phys. Chem. B,* 1999, 103, 4318]. Microscopy studies show the unroping of such fluoronanotubes to yield bundles with diameters ten times smaller than that seen for pristine SWNTs—thus resulting in their improved dispersion and processability.

It has been shown that the C—F bond in fluoronanotubes is rather weak and therefore fluorine can be substituted or removed using wet chemistry methods [Boul et al., *Chem. Phys. Lett.,* 1999, 310, 367]. Applicants have used such an approach based on fluorine displacement reactions in fluoronanotubes to develop a group of methods for the production of amino- and hydroxyl-group terminated SWNT derivatives [V. N. Khabashesku, J. L. Margrave, *Chemistry of Carbon Nanotubes in Encyclopedia of Nanoscience and Nanotechnology*, Ed. H. S. Nalwa, American Scientific Publishers, 2004; Khabashesku et al., *Acc. Chem. Res.* 2002, 35 (12), 1087; Stevens et al., *Nano Lett.* 2003, 3, 331; Zhang et al., *Chem. Mater.* 2004, 16(11), 2055; and commonly assigned co-pending U.S. patent application Ser. No. 10/714,187, filed Nov. 14, 2003.

"Amino-nanotubes" have been prepared by heating fluoronanotube dispersions in diamines $NH_2(CH_2)_nNH_2$ (n=2–6) at 100° C. for 1-3 hrs in the presence of pyridine (Py) as a catalyst [Stevens et al., *Nano Lett.* 2003, 3, 331]. The presence of primary terminal amino groups in the prepared amino-nanotubes was established by a color reaction with ninhydrin (Kaiser test), used routinely in biochemistry on aminoacids and peptides, and by formation of C(=O)NH peptide linkages in the reaction with adipoyl chloride to produce a nylon-nanotube polymer material. Based on thermal gravimetric analysis (TGA) weight loss and energy-dispersive analysis of X-rays (EDAX) data, the degree of sidewall functionalization in such amino-nanotubes was estimated as being 1 functional group per 8 to 12 carbon atoms of the carbon nanotube.

Fluoronanotubes have also been used as precursors for the preparation of a series of "hydroxyl-nanotubes" by two simple and inexpensive methods. In the first method, fluoronanotubes are reacted with diols and triols pre-treated with LiOH. In the second method, the reactions with amino alcohols in the presence of pyridine are utilized [Zhang et al., Chem. Mater. 2004, 16(11), 2055]. The degree of sidewall functionalization in such "hydroxyl-nanotube" derivatives was estimated to be in the range of 1 functional group per every 15 to 25 nanotube carbons, depending upon the derivatization method and alcohol reagent used. The "hydroxyl-nanotubes" form stable suspensions/solutions in polar solvents, such as water, ethanol and dimethylformamide, which facilitate their improved processing in copolymers and in ceramics nanofabrication, and their compatibility with biomaterials.

Another novel approach to derivatizing (functionalizing) SWNTs involves the addition of functional organic radicals generated from acyl peroxides, e.g., succinic or glutaric acid peroxides to SWNT sidewalls. The "carboxyl-nanotubes" prepared by this method were characterized by subsequent reactions with $SOCl_2$ and diamines to form amides, which presented the chemical evidence for covalent attachment of —COOH group-terminated carboxy-alkyl radicals to the SWNTs. Compared to pristine SWNTs, the "carboxyl-nanotubes" show an improved solubility in polar solvents, e.g., alcohols (1.25 mg/ml in iso-propanol) and water. The degree of SWNT sidewall functionalization with the carboxyl-terminated groups was estimated to be about 1 functional group per every 24 nanotube carbons, based on thermogravimetric-mass spectrometric (TG-MS) data [Peng et al., J. Am. Chem. Soc. 2003, 125, 15174; commonly assigned co-pending U.S. patent application Ser. No. 10/714,014, filed Nov. 14, 2003]. The attachment of functional groups to nanotube sidewalls has been directly verified by transmission electron microscopy (TEM) with images depicting "bumpy" and "hairy" surfaces of the single nanotubes.

The preparation of SWNTs derivatized with functional groups on their sidewalls permits their use in applications using their hydrogen bonding ability and the chemical reactivity of their respective terminal —$NH_2$, —COOH and —OH groups in biomaterials, such as biosensors, vehicles for drug delivery, nanotube-reinforced biopolymers, and ceramics for tissue engineering and implants in orthopedics and dentistry. The sidewall functional groups, as well as the activated unsaturated carbon-carbon bonds on the nanotube surface, can also act as a free radical scavengers and can likely demonstrate a high antioxidant activity in aging treatment applications. The related experimental data on these nanosystems are yet unknown, while studies of the similarly functionalized fullerene $C_{60}$ derivatives as antioxidants are already in progress. Methods of using such chemistry to directly incorporate carbon nanotubes into biological molecules, such as amino acids, could further extend such biomedical applications of CNTs.

BRIEF DESCRIPTION OF THE INVENTION

The present invention is directed toward compositions comprising carbon nanotubes (CNTs) that are sidewall-functionalized with amino acid groups, and to amino acid compositions comprising carbon nanotubes. The present invention is also directed to simple and relatively inexpensive methods for the preparation of such compositions.

In some embodiments, fluorinated single-wall carbon nanotubes (fluoronanotubes) are reacted with amino acids or amino acid esters in the presence of pyridine. In such embodiments, the amino acids react with the fluoronanotubes to form C—N bonds through the amino group, eliminating HF in the process, and yielding a carbon nanotube product that is functionalized with amino acid groups and which possesses the general formula:

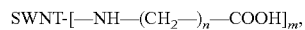
SWNT-[—NH—$(CH_2)_n$—COOH]$_m$, where n ranges from about 1 to about 20, and m ranges from about 1 to about 10,000.

In some embodiments, carbon nanotubes are reacted with peroxide species to yield functionalized carbon nanotube intermediate species comprising carboxylic acid functional groups. These intermediate species are then made to undergo a Hell-Volhard-Zelinskii-type reaction and subsequent amination to yield a functionalized carbon nanotube product having the general formula:

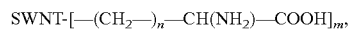
SWNT-[—$(CH_2)_n$—CH($NH_2$)—COOH]$_m$, where n ranges from about 1 to about 20, and m ranges from about 1 to about 10,000, wherein such compositions can be viewed as amino acids of the general formula:

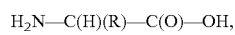
$H_2N$—C(H)(R)—C(O)—OH, where R comprises a SWNT and all the other amino acid functional groups attached thereto.

The series of functionalized CNTs and nanotube-amino acids (nanotube amino acid compositions) prepared by the methods described herein show improved solubility in water, ethanol, isopropanol, chloroform, and other polar solvents, which is important for compatibility with bio systems, polypeptide syntheses and drug delivery. Furthermore, the methods of the present invention for preparing such nanotube-amino acid compositions, as described herein, are simple, efficient, and amenable to scale-up with a limited number of steps. Potential uses of nanotube-amino acids include use in bio-systems for targeted drug delivery.

The methods and compositions of the present invention are novel in that no similar methods for this type of sidewall functionalization exist. Possible variations include the direct attachment of peptides, oligonucleotides, and proteins to the sidewalls of the nanotubes and an extension of demonstrated methods to multi-wall and double-wall carbon nanotubes.

The foregoing has outlined rather broadly the features of the present invention in order that the detailed description of the invention that follows may be better understood Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is directed toward nanotube-amino acid compositions comprising carbon nanotubes that are sidewall-functionalized with amino acid groups, and to amino acid compositions comprising carbon nanotubes. The present invention is also directed to simple and relatively inexpensive methods for the preparation of such compositions.

Carbon nanotubes (CNTs), according to the present invention, include, but are not limited to, single-wall carbon nanotubes (SWNTs), double-wall carbon nanotubes (DWNTs), multi-wall carbon nanotubes (MWNTs), and combinations thereof. All methods of making CNTs yield product with carbonaceous impurities. Additionally, most methods of making SWNTs, and many methods of making MWNTs, use metal catalysts that remain in the product as impurities. While the examples described herein have generally been done with single-wall carbon nanotubes (SWNTs) produced by the HiPco method, it should be understood that the methods and compositions described herein are generally applicable to all carbon nanotubes made by any known method—provided they are susceptible to the chemistries described herein by virtue of their reactivity. Furthermore, the nanotubes can be subjected to any number of post-synthesis procession steps, including cutting, length sorting, chirality sorting, purification, etc., prior to being subjected to the chemical modifications described herein.

In some embodiments, the nanotube amino acid compositions of the present invention are functionalized SWNTs that are sidewall-functionalized with amino acid groups and which possess the general formula:

SWNT-[—NH—(CH$_2$—)$_n$—COOH]$_m$, where n ranges from about 1 to about 20, and m ranges from about 1 to about 10,000.

Such above-described nanotube amino acid compositions can have a variety of lengths and diameters. Lengths are generally in the range of about 5 nm to about 5 µm, but can be longer. Diameters of the nanotube amino acids vary depending upon the type and extent of functionalization, but the underlying nanotubes generally have diameters in the range of about 0.5 nm to about 3 nm, although this can be greatly increased if the nanotube amino acid composition comprises a functionalized MWNT.

In some embodiments, fluoronanotubes are used as precursors to make nanotube amino acid compositions. Fluoronanotubes or fluorinated SWNTs (F-SWNTs), according to the present invention, comprise SWNTs with fluorine attached to their sidewalls and ends (Note: the ends of such F-SWNTs may be open). The fluoronanotubes have a stoichiometric formula CF$_n$, where n ranges generally from about 0.01 to about 0.50, and more typically from about 0.1 to about 0.5. Such fluoronanotubes are described in commonly assigned co-pending U.S. patent application Ser. No. 09/787,473; and I. W. Chiang, Ph.D. Dissertation, Rice University, 2001; and Gu et al., *Nano Lett.*, 2002, 2, 1009.

Figure 1:
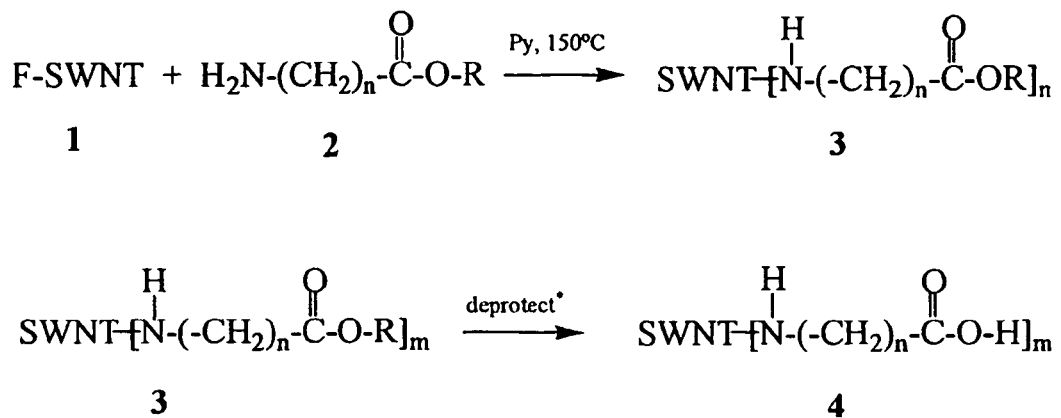
FIG. 1 depicts reaction Scheme 1.

Reactions involving F-SWNTs have been described generally in Stevens et al., *Nano Lett.*, 2003, 3(3), 331-336. Referring to FIG. 1 (Scheme 1), in some embodiments, fluoronanotubes 1 are reacted with an amino ester 2 in the presence of pyridine (Py) at elevated temperature (e.g., 150° C.) to yield intermediate 3. Intermediate 3 then typically undergoes a hydrolysis treatment to yield nanotube-amino acid 4. Considerable variation exists in the extent of functionalization and in the amino acid ester employed in the functionalization.

In some embodiments, the nanotube amino acid compositions of the present invention have the general formula:

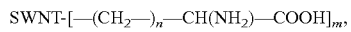

SWNT-[—(CH$_2$—)$_n$—CH(NH$_2$)—COOH]$_m$, where n ranges from about 1 to about 20, and m ranges from about 1 to about 10,000, and wherein such compositions can be viewed as amino acids of the general formula:

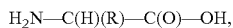

H$_2$N—C(H)(R)—C(O)—OH, where R is treated as a point group comprising a SWNT and all the other amino acid functional groups attached thereto.

Like the previously-described amino acid compositions, such above-described nanotube amino acid compositions can have a variety of lengths and diameters. Lengths are generally in the range of about 5 nm to about 5 µm, but can be longer. Diameters of the nanotube amino acids vary depending upon the type and extent of functionalization, but the underlying nanotubes generally have diameters in the range of about 0.5 nm to about 3 nm, although this may be greatly increased if the nanotube amino acid composition comprises a functionalized MWNT.

Figure 2:
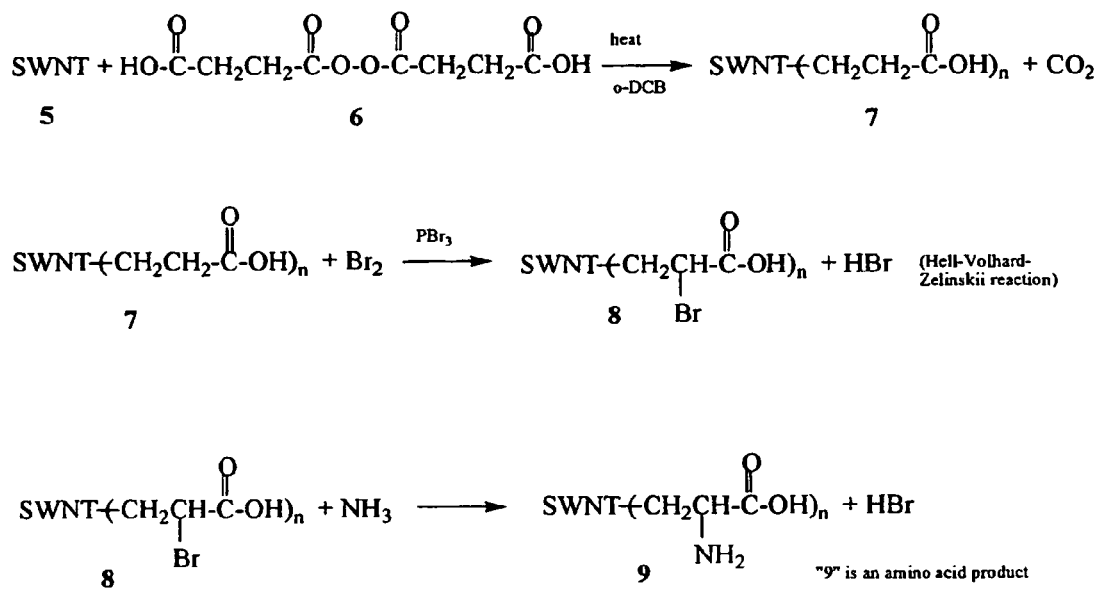
FIG. 2 depicts reaction Scheme 2.

In some embodiments, SWNTs are reacted with peroxide species to form functionalized SWNT intermediate species capable of undergoing further functionalization. See Khabashesku et al., *Acc. Chem. Res.*, 2002, 35, 1087, for examples of such peroxide reactions. Referring to FIG. 2 (Scheme 2), SWNTs 5 are reacted with a peroxide species, such as peroxide species 6, to yield functionalized SWNT intermediate 7. Functionalized SWNT intermediate 7 then undergoes a Hell-Volhard-Zelinskii-type reaction to yield the brominated (or chlorinated) species 8. Brominated species 8 is then aminated to yield amino acid product 9.

Aside from incorporating MWNTs into the above-described compositions and methods, a number of other variations exist. Most notably, such chemistry can be applied to nanodiamond and the broader class of fullerenes and fullerene materials.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLE 1

The method described in this example uses a peroxide-based functionalization of SWNTs to attach a carboxy-ethyl groups to the tube sidewalls, as shown in FIG. 2 (Scheme 2). Once this carboxy-ethyl group is attached to yield 7, a bromination reaction is performed to substitute for one of the hydrogens on the functional group. Finally, ammonia is used to aminate the halocarbon functional group, producing an amino-acid functionalized tube.

To generate carboxy-ethyl tubes 7, HiPco SWNTs were dispersed in ortho-dichlorobenzene (o-DCB) and refluxed at 80-100° C. under a nitrogen purge for approximately 72 hours. In order to substitute an amine onto the carboxy-ethyl group, one of the α hydrogens must first be replaced with a bromine atom. This is a common reaction, carried out under reflux by reaction with liquid elemental bromine and catalyzed by elemental red phosphorus or PBr$_3$. The bromine reacts with the functional group, creating HBr and substituting Br in place of the α hydrogen to generate 8.

The reaction conditions for the above-described bromination are reflux at 40-60° C. in dry CCl$_4$ for approximately 4 hours. Once the bromine is present in the alpha (α) position, a liquid phase reaction with ammonia produces another molecule of hydrobromic acid and attaches an —NH$_2$ group in the place of the bromine atom to yield nanotube-amino acid product 9.

EXAMPLE 2

In this Example, fluorinated SWNTs (F-SWNTs) were reacted directly with amino acid functionalities, as shown in FIG. 1 (Scheme 1).

HiPco SWNTs were fluorinated to an approximate stoichiometry of C$_3$F. These F-SWNTs were reacted with a protected glycine ester under reflux. The ester protects the amino acid's carboxylic acid group, thereby preventing self-polymerization of the acid. The amino group reacts with the fluorine on the tube wall, creating HF and a carbon-nitrogen bond to the sidewall. Thus, the glycine is able to replace the fluorine and functionalize the nanotube.

Reaction conditions for the above-described process are as follows. Glycine, protected with ethoxy group (glycine ethyl ester) to prevent self-polymerization, was reacted with fluoronanotubes, wherein the glycine:fluoronanotubes mass ratio was 25:1. The reaction was allowed to proceed for 2 hours at 75° C. with sonication, after which the product was washed in ethanol.

To facilitate further chemistry being done with the carboxcylic acid endgroup of the amino acid, it is important to be able to deprotect the acid group; that is, to remove the ester and replace the loosely bonded acidic hydrogen. To perform this reaction, a slightly basic reagent is generally used such that it attacks the oxygen-alkyl ester bond. Hydrolysis is performed in a 50%/50% v:v water/ethanol solution with an alkali carbonate or bicarbonate (usually sodium carbonate) in dilute concentration. After several hours reaction time, the product is filtered and washed with additional ethanol, then soaked in dilute 1M HCl to acidify the deprotected side groups.

Figure 3:
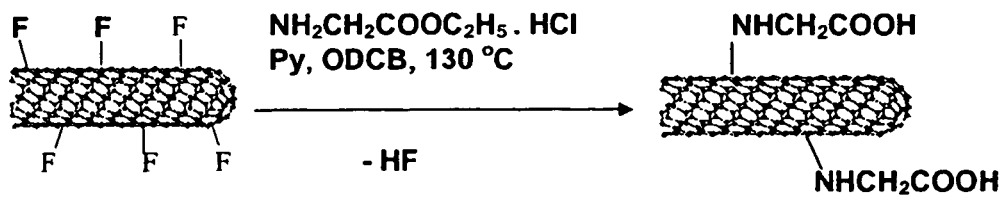
FIGS. 3A and 3B depict reactions of fluoronanotubes with glycine ester (A) and cysteine (B).
Figure 3:
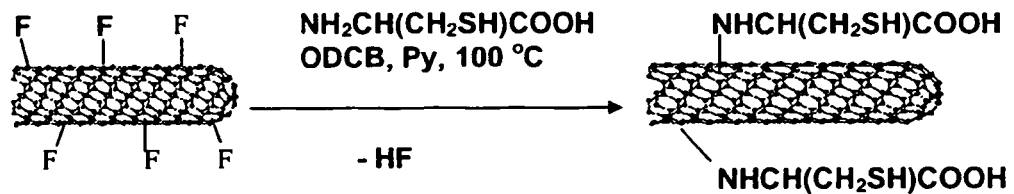

FIG. 3A illustrates the above-described reaction with the glycine ester. The degree of sidewall functionalization in the resulting glycine-nanotubes was estimated to be as high as 1 glycine group per every 12 nanotube carbons. Additionally, as shown in FIG. 3B, fluoronanotubes were reacted directly with cysteine to produce cystein-nanotubes. In contrast to the glycine-nanotubes, the degree of sidewall functionalization in cysteine-nanotubes was found to be lower: approximately 1 cysteine group per every 24 nanotube carbon atoms. The nanotube amino acid compositions prepared by this method show improved solubility in water, ethanol, isopropanol, chloroform, and other polar solvents, which is essential for compatibility with bio-systems, polypeptide syntheses and drug delivery.

EXAMPLE 3

This Example illustrates further reaction scenarios in which the nanotube-amino acids of the present invention can be made to undergo.

Peptide synthesis is normally performed using a polymer resin support for the duration of the synthesis, at the end of which trifluoroacetic acid is used to cleave the polypeptide from the support. Modest success has already been achieved by applying this protocol to the nanotube-peptide product, however, the conditions are not yet optimized. Significant heat is needed to cleave the product, suggesting that the carbon-nitrogen bond of the aminated tube is quite strong.

Once one amino acid has been attached to the tube wall, it becomes relatively simple to use the nanotube as a support for peptide synthesis by simply adding further amino acids in the desired order and quantity. Of particular interest is the fact that the nanotube, unlike conventional supports, is biologically compatible and therefore would not have to be cleaved from the peptide product upon completion of the synthesis. From there it is easy to see the possibilities for a protein-containing carbon nanotube: the protein(s) could be. synthesized as desired to target specific sites in the body or even specific kinds of tissue even more accurately than currently possible, thereby creating new avenues for drug delivery and for a variety of fullerene-encapsulated metal applications such as contrast agents for magnetic resonance imaging (MRI) or for cancer treatment.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A nanotube-amino acid composition having the general formula:

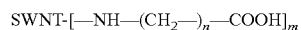

$$\text{SWNT-}[\text{—NH—}(\text{CH}_2\text{—})_n\text{—COOH}]_m$$

where n is between about 1 and about 20, and m is between about 1 and about 10,000.

2. The nanotube amino acid composition of claim 1, wherein the length of said composition is between about 5 nm and about 5 μm.

3. The nanotube amino acid composition of claim 1, wherein the water solubility of said composition exceeds that of unfunctionalized SWNTs.

4. A method of making the nanotubes-amino acid of claim 1 comprising the steps of:
   a) providing a plurality of fluorinated SWNTs;
   b) reacting said fluorinated SWNTs with an ester of an amino acid to form amino ester-functionalized SWNTs; and
   c) hydrolyzing said amino ester-functionalized SWNTs to yield the nanotubes-amino acid of claim 1.

5. The method of claim 4, wherein the fluorinated SWNTs comprise a stoichiometery CF$_n$, where n ranges from about 0.01 to about 0.5.

6. The method of claim 4, wherein the step of reacting further comprises a pyridine catalyst.

7. The method of claim 4, wherein the step of reacting comprises a reaction temperature that ranges from about 25° C. to about 150° C.

8. The method of claim 4, wherein the step of hydrolyzing comprises use of an alkali carbonate.

9. The method of claim 4, wherein the step of hydrolyzing comprises use of an alkali bicarbonate.

* * * * *